United States Patent
Hamada et al.

(10) Patent No.: US 9,755,223 B2
(45) Date of Patent: Sep. 5, 2017

(54) TREATMENT PROCESS FOR A POSITIVE ELECTRODE ACTIVE MATERIAL FOR LITHIUM-ION SECONDARY BATTERY

(71) Applicant: NIHONKAGAKUSANGYO CO., LTD., Tokyo (JP)

(72) Inventors: Kazuhiro Hamada, Soka (JP); Yoshito Sugibuchi, Soka (JP); Hajime Kashima, Soka (JP)

(73) Assignee: NIHONKAGAKUSANGYO CO., LTD., Tokyo (JP)

( * ) Notice: Subject to any disclaimer, the term of this patent is extended or adjusted under 35 U.S.C. 154(b) by 0 days.

(21) Appl. No.: 14/774,286

(22) PCT Filed: Mar. 14, 2014

(86) PCT No.: PCT/JP2014/056942
§ 371 (c)(1),
(2) Date: Sep. 10, 2015

(87) PCT Pub. No.: WO2014/142314
PCT Pub. Date: Sep. 18, 2014

(65) Prior Publication Data
US 2016/0043383 A1   Feb. 11, 2016

(30) Foreign Application Priority Data
Mar. 14, 2013   (JP) .................................. 2013-051563

(51) Int. Cl.
*H01M 4/04* (2006.01)
*H01M 4/36* (2006.01)
*H01M 10/0525* (2010.01)
*H01M 4/525* (2010.01)
*H01M 4/02* (2006.01)

(52) U.S. Cl.
CPC ......... *H01M 4/0471* (2013.01); *H01M 4/049* (2013.01); *H01M 4/36* (2013.01); *H01M 10/0525* (2013.01); *H01M 4/525* (2013.01); *H01M 2004/028* (2013.01); *H01M 2220/30* (2013.01)

(58) Field of Classification Search
None
See application file for complete search history.

(56) References Cited

U.S. PATENT DOCUMENTS

| | | |
|---|---|---|
| 2008/0222881 A1 | 9/2008 | Yu et al. |
| 2009/0081550 A1 | 3/2009 | Inoue et al. |
| 2011/0171095 A1* | 7/2011 | Mepsted ................. C01B 25/45 423/277 |
| 2011/0171529 A1 | 7/2011 | Kono et al. |
| 2012/0088949 A1* | 4/2012 | Hussey ..................... G21F 9/12 588/18 |
| 2014/0087262 A1* | 3/2014 | Imahashi .............. H01M 4/505 429/223 |
| 2014/0186709 A1 | 7/2014 | Iwanaga et al. |

FOREIGN PATENT DOCUMENTS

| | | |
|---|---|---|
| JP | H03-074054 A | 3/1991 |
| JP | H09-231963 A | 9/1997 |
| JP | 2009-032656 A | 2/2009 |
| JP | 2009-076383 A | 4/2009 |
| JP | 2010-064944 A | 3/2010 |
| JP | 2011-100633 A | 5/2011 |
| JP | 2011100633 A * | 5/2011 |
| JP | 2012-113823 A | 6/2012 |
| JP | 2013-026199 A | 2/2013 |
| WO | 2010/116839 A1 | 10/2010 |
| WO | 2012/141258 A1 | 10/2012 |

OTHER PUBLICATIONS

JP 2011-100633 A English Machine Translation.*
PCT, "International Search Report for International Application No. PCT/JP2014/056942," Jun. 17, 2014.

* cited by examiner

*Primary Examiner* — Scott J Chmielecki
(74) *Attorney, Agent, or Firm* — Manabu Kanesaka

(57) ABSTRACT

In a treatment process for a positive electrode active material for a lithium-ion secondary battery, Li compounds such as $Li_2CO_3$, LiOH, and the like, present in a positive electrode active material for a lithium-ion secondary battery but unsuitable for a positive electrode material, is removed. In a case wherein the resultant Li compound is used as a positive electrode material of the secondary battery, a discharge capacity and an average discharge voltage of the secondary battery do not decline, and gelation caused by a cleaning treatment is prevented. The positive electrode active material is cleaned with a cleaning fluid containing $NH_3$, and then solid-liquid separation is performed, and a solid component is calcined at 600 to 700° C. in an oxygen atmosphere. The cleaning fluid has a conductivity of 11.6 mS/cm or less, and contains a recovered liquid component and may be repeatedly used as a cleaning fluid.

1 Claim, No Drawings

TREATMENT PROCESS FOR A POSITIVE ELECTRODE ACTIVE MATERIAL FOR LITHIUM-ION SECONDARY BATTERY

RELATED APPLICATIONS

The present application is National Phase of International Application No. PCT/JP2014/056942 filed Mar. 14, 2014, and claims priority from Japanese Application No. 2013-051563, filed Mar. 14, 2013, the disclosure of which is hereby incorporated by reference herein in its entirety.

FIELD OF TECHNOLOGY

The present invention relates to a treatment process for a positive electrode active material for removing lithium hydroxide, lithium carbonate, and the like contained in the positive electrode active material used as a positive electrode material for a lithium-ion secondary battery.

BACKGROUND ART

Recently, miniaturization and a high-performance of electronic apparatuses such as a personal computer, a cellphone, and the like have advanced rapidly, and as a power source for those, a demand for a small and light secondary battery having a high energy density is getting higher. Under such circumstances, a lithium-ion secondary battery having large charge and discharge capacity is widely used.

Conventionally, the positive electrode active material of the lithium-ion secondary battery contains cobalt as a main component. However, cobalt is a rare metal and expensive.

Therefore, attention is made to a positive electrode active material containing nickel as a main component. The positive electrode active material containing nickel as a main component contains low cobalt content compared to the positive electrode active material containing cobalt as a main component so as to have low cost. However, in the positive electrode active material containing nickel as a main component, there are present many lithium compounds such as lithium hydroxide, lithium carbonate, and the like, which are by-products and the like in an unreacted residue or at a time of synthesizing, on a particle surface or between primary particles.

Generally, in a case wherein a positive electrode active material for a lithium-ion secondary battery containing a large amount of lithium carbonate is used as a positive electrode material of a battery, the lithium carbonate decomposes, and produces carbon dioxide inside the battery so as to increase a pressure inside the battery to cause the bulging of the battery, or reduce battery characteristics such as charge/discharge efficiency and the like. Moreover, in a case wherein a positive electrode active material for a lithium-ion secondary battery containing a large amount of lithium hydroxide is used as the positive electrode material of the battery, gelation of a positive electrode paste is induced, so that a process of applying the positive electrode paste becomes difficult.

As for a method for solving the aforementioned problem, there are proposed a method for cleaning the positive electrode active material with water or an aqueous solution in which lithium is dissolved (Patent Document 1); a method for cleaning the positive electrode active material with an aqueous solution having pH 7 or above such as ammonia water, an aqueous lithium hydroxide solution, and the like (Patent Document 2); and some other methods for a cleaning treatment using various solutions.

However, even if the cleaning treatment of the positive electrode active material for a lithium-ion secondary battery is carried out by the conventionally proposed methods, the removal of lithium hydroxide or lithium carbonate, which is unsuitable for the positive electrode material contained in the positive electrode active material, is not necessarily sufficient.

Additionally, recently, the production quantity and usage of the lithium-ion secondary battery are expanding (for example, a storage battery for a solar power generation, a battery for an electric power source for an electric vehicle, an airplane, and the like), so that a large quantity of positive electrode active materials is required, and as a result, there arises a new problem that a large quantity of waste fluid generated in a production process of the positive electrode active materials has to be treated.

PRIOR ART DOCUMENT

Patent Document

Patent Document 1: Japanese Unexamined Patent Application Publication No. 2010-64944
Patent Document 2: Japanese Unexamined Patent Application Publication No. 2011-100633

SUMMARY OF THE INVENTION

Problems to be Solved by the Invention

The present invention is made in view of the aforementioned situations, and an object of the present invention is to provide a treatment process for a positive electrode active material for a lithium-ion secondary battery, which can sufficiently remove lithium hydroxide or lithium carbonate, which is unsuitable for the positive electrode material contained in the positive electrode active material for a lithium-ion secondary battery, and in a case wherein the positive electrode active material for a lithium-ion secondary battery is the positive electrode material of the lithium-ion secondary battery, a discharge capacity of the secondary battery does not decline, and even if the positive electrode paste is stored under certain conditions, gelation is prevented, and additionally, a treatment of a cleaning waste fluid after the cleaning treatment, or a recovery of valuables in the waste fluid can be extremely easily carried out.

Means for Solving the Problems

In order to obtain the aforementioned object, after a great consideration, the present inventors discovered the following to propose the present invention. First, a positive electrode active material is made slurry and cleaned in a cleaning fluid containing ammonia. Then, this slurry is subjected to solid-liquid separation, and a dehydrated and dried solid component is calcined at a predetermined temperature in an oxygen atmosphere so as to obtain a positive electrode active material wherein the content of lithium hydroxide or lithium carbonate is reduced as little as possible, and by using the positive electrode active material as a positive electrode material, a lithium-ion secondary battery, wherein the swelling in the battery does not occur, and the decline in charge-discharge characteristics is little, can be obtained. Moreover, the present inventors unexpectedly found as follows. In a case wherein the cleaning fluid, which is recovered after the positive electrode active material is cleaned once, is repeatedly used as the next and succeeding cleaning fluid of the positive electrode active material, the result thereof is the same or more than the result of a case wherein a new cleaning fluid is used.

Namely, a treatment process for a positive electrode active material for a lithium-ion secondary battery of the present invention has the following characteristics.

(1) The aforementioned positive electrode active material is contacted with the cleaning fluid containing ammonia to be cleaned, and then, is subjected to the solid-liquid separation, and the solid component is calcined at 600 to 700° C. in an oxygen atmosphere.

At that time, the aforementioned cleaning fluid is that (2) the conductivity is 11.6 mS/cm or less; (3) there may include a recovered liquid component; and (4) there may include the repeatedly used cleaning fluid as the cleaning fluid.

(5) Moreover, in the treatment process for a positive electrode active material for the lithium-ion secondary battery of the present invention, it is preferable that a discharge capacity of 4.25 to 3.5 V of the lithium-ion secondary battery wherein the positive electrode active material for the lithium-ion secondary battery treated by the treatment process described in any of the aforementioned (1) to (4) is used as the positive electrode material has 99% or above relative to that before being cleaned.

Effect of the Invention

According to the treatment process for a positive electrode active material of the present invention, quantities of both lithium hydroxide and lithium carbonate, which are unsuitable for the positive electrode material contained in the positive electrode active material, can be significantly reduced.

Also, according to the treatment process of the present invention, in a case wherein the treated positive electrode active material is used as the positive electrode active material for the lithium-ion secondary battery, both the first discharge capacity and an average discharge voltage become 99.5% or above of an untreated product, and the swelling in the battery does not occur. Additionally, the lithium-ion secondary battery having excellent charge-discharge characteristics can be obtained.

Moreover, in the treatment process of the present invention, in the case wherein the cleaning fluid is recovered each time a treatment is carried out, and is repeatedly used as the cleaning fluid for the next treatment, the result thereof is the same or more than the result as in the case wherein the new cleaning fluid is used. Also, a performance improving effect as the positive electrode material as well as a cost reduction effect of a treatment process can be obtained.

Moreover, in this process, compared to a conventional cleaning waste fluid, a quantity of the waste fluid is significantly reduced. Additionally, concentrations of lithium carbonate, lithium hydroxide, and the like in the waste fluid are significantly high, and not only a waste fluid treatment can be extremely simplified, but also valuables such as lithium carbonate, lithium hydroxide, and the like in the waste fluid can be recovered with high efficiency.

BEST MODES OF CARRYING OUT THE INVENTION

A positive electrode active material treated by a treatment process of the present invention is used for a lithium-ion secondary battery formed by a positive electrode, a negative electrode, a separator, a non-aqueous electrolyte containing a lithium salt, and the like. The aforementioned positive electrode is made by applying a positive electrode mixture containing the positive electrode active material, a conductive agent, and a binder on a positive electrode plate (for example, a positive electrode current collector formed by an aluminum plate and the like).

In the treatment process of the present invention, the aforementioned positive electrode active material (also referred to as a positive electrode active material to be cleaned) is made slurry in a cleaning fluid containing ammonia, and this slurry is sufficiently stirred so as to be cleaned.

As for the cleaning fluid, there is used, i.e., ammonia water containing ammonia. It is preferable that an ammonia ($NH_3$) concentration in the cleaning fluid is 0.5 to 10 g/L. In the present invention, alcohol such as ethanol and the like may be contained in the ammonia water. Ethanol is azeotropic with water, so that the removal of water becomes easy in a drying process after a cleaning operation. If an alcohol concentration is too small, this effect cannot be obtained, and even if the alcohol concentration is too large, the effect is reduced, so that it is preferable to have a concentration of 50 to 96% by weight.

Also, in the aforementioned cleaning fluid, if the conductivity is too high, i.e., the concentration of lithium compounds, removed from the positive electrode active material by water washing before, is too high, a removal effect of residual lithium compounds declines, so that it is suitable that the conductivity is 11.6 mS/cm or less, preferably, 10.6 mS/cm or less, more preferably, 10.0 mS/cm or less.

It is preferable that the quantity of the positive electrode active material to be cleaned, which is cleaned with the cleaning fluid described above, is 30 to 50% by weight relative to the quantity of the cleaning fluid with respect to cleaning efficiency.

The positive electrode active material becomes a slurry in the cleaning fluid, and after being sufficiently stirred in a slurry state, the positive electrode active material is left still as it is for a while. A stirring time at that time is not especially limited, and although it depends on the quantity of the positive electrode active material to be cleaned, it is sufficient to stir the positive electrode active material at least for 20 minutes to one hour. The temperature of the slurry at the stirring time may be a room temperature, and may be under the room temperature to approximately 30° C.

The slurry of the positive electrode active material to be cleaned, which is left still after being cleaned, is separated into a liquid component and a solid component, and the solid component is dried.

The positive electrode active material to be cleaned which is the solid component after being dried is calcined in an oxygen atmosphere while ventilating oxygen, air, and the like. It is preferable that a calcining atmosphere has an oxygen concentration of 92 to 100% by volume. As for a calcining condition at that time, although it depends on the quantity of the solid component provided for heating, it is suitable to be burned at 600 to 700° C. for 2 to 8 hours.

In the aforementioned cleaning fluid, the liquid component at a time of the aforementioned solid-liquid separation is recovered in addition to a newly prepared cleaning fluid, and this can be repeatedly used as the cleaning fluid at a time of the next treatment of the positive electrode active material. The cleaning fluid can be recovered as the liquid component whenever the positive electrode active material is treated, and can be repeatedly used as the cleaning fluid. In a case wherein a cleaning treatment of the positive electrode active material to be cleaned is carried out by the repeatedly used cleaning fluid, due to an action presumed to be an affinity by lithium carbonate, lithium hydroxide, and the like gradually accumulated in the cleaning fluid (which have been attached into the active material until immediately before a transition to the cleaning fluid), there can be obtained a cleaning effect equal to or more than that in a case wherein the newly prepared cleaning fluid is used, i.e., the quantity of an unsuitable compound as a positive electrode material such as lithium carbonate, lithium hydroxide, and the like present in a positive electrode active material to be treated can be excellently reduced.

Also, the lithium-ion secondary battery wherein the positive electrode active material treated by such a cleaning fluid is used as the positive electrode material excellently suppresses the deterioration in a discharge characteristic.

Obviously, the ammonia concentration, the conductivity, and the like of the aforementioned repeatedly used cleaning fluid are as stated above, and the positive electrode active material is treated by the cleaning fluid under such conditions, so that the unsuitable compound in the case of using the positive electrode active material as the positive electrode material present in the positive electrode active material can be excellently removed at low cost, and as a result, the deterioration in battery characteristics of the lithium-ion secondary battery using the positive electrode active material can be also excellently suppressed.

Also, according to the process of the present invention wherein the cleaning fluid is repeatedly used, the quantity of a used cleaning fluid (a waste fluid) decreases sharply, and a cost as well as a process required for a conventional waste fluid treatment is significantly reduced. In addition, a recovery of valuables such as lithium carbonate, lithium hydroxide, and the like accumulated in the waste fluid can be also extremely excellently implemented.

As for the positive electrode active material to be treated in the present invention, there is cited a Ni based complex oxide, especially, the positive electrode active material which can be preferably treated is a Ni—Co—Al based complex oxide.

EMBODIMENTS

First Embodiment

A lithium-ion secondary battery positive electrode active material having a composition of $Li_{1.05}Ni_{0.85}Co_{0.12}Al_{0.03}O_2$, and containing 0.48% by weight of lithium carbonate ($Li_2CO_3$) and 0.99% by weight of lithium hydroxide (LiOH) was made as the positive electrode active material to be cleaned, and 150 g of this material was added to 300 mL of ammonia water (hereinafter, "the first cleaning fluid") containing 1 g/L of ammonia ($NH_3$) to make a slurry, and the slurry was separated into the liquid component and the solid component after being stirred for an hour.

Next, the obtained solid component was dried under reduced pressure (134 mmHg at 140° C. for 12 hours) to obtain a dried product (hereinafter, "the first dried product"). While ventilating the first dried product with an oxygen gas (93% by volume of an oxygen gas concentration) in an electric furnace, the first dried product was calcined at 650° C. for 6 hours so as to obtain a positive electrode active material (hereinafter, "the first positive electrode active material") in the First Embodiment.

Second Embodiment

A second cleaning fluid was made by adding the same ammonia water used in the First Embodiment to the liquid component obtained by the solid-liquid separation in the First Embodiment until the whole quantity became 300 mL. Added quantities are shown in Table 3. Except that the second cleaning fluid is used, in the same manner as the First Embodiment, a dried product (hereinafter, "a second dried product") and a positive electrode active material (hereinafter, "a second positive electrode active material") were obtained by carrying out the cleaning treatment of the positive electrode active material to be cleaned having the same composition as that in the First Embodiment.

Except that the liquid component treated by the aforementioned second cleaning fluid, and obtained by the solid-liquid separation, is used; a third cleaning fluid was made by the same operation as was used in the case of the second cleaning fluid; and a dried product (hereinafter, "a third dried product") and a positive electrode active material (hereinafter, "a third positive electrode active material") were obtained by carrying out the cleaning treatment to the positive electrode active material to be cleaned having the same composition as that in the First Embodiment in the same manner as the First Embodiment except that the third cleaning fluid is used; and except that the liquid component treated by the aforementioned third cleaning fluid, and obtained by the solid-liquid separation, is used; a fourth cleaning fluid was made by the same operation as was used in the case of the third cleaning fluid; and a dried product (hereinafter, "a fourth dried product") and a positive electrode active material (hereinafter, "a fourth positive electrode active material") were obtained by carrying out the cleaning treatment to the positive electrode active material to be cleaned having the same composition as that in the First Embodiment in the same manner as the First Embodiment except that the fourth cleaning fluid is used, and hereinafter, in the same manner, fifth to tenth dried products and fifth to tenth positive electrode active materials were obtained.

Reference Example

The positive electrode active material to be cleaned, which is the same as that used in the First Embodiment, and wherein both the cleaning treatment and a heat treatment are not carried out, was made as an untreated active material;

the positive electrode active material to be cleaned, which is the same as that used in the First Embodiment, and wherein only the cleaning treatment in the First and Second Embodiments was carried out, and the heat treatment was not carried out, was made as a dried product; and the positive electrode active material to be cleaned, which is the same as that used in the First Embodiment, and wherein only the heat treatment was carried out without carrying out the cleaning treatment, was made as an active material with only the heat treatment.

Evaluations

Evaluation tests regarding the dried products (the first to tenth dried produces) and the positive electrode active materials (the first to tenth positive electrode active materials, the untreated active material, and the active material with only the heat treatment) obtained in the First to Second Embodiments and the Reference Example were carried out as follows. Results are shown in Table 1 (dried products after being cleaned) and Table 2 (heat-treated products).

(1) Battery test: Carried out by the following method.

Acetylene black of 7% by weight and PTFE (polytetrafluoroethylene) of 3% by weight were kneaded to the dried product or the positive electrode active material of 90% by weight to make the positive electrode material. The positive electrode material was extended to have a thickness of 70 µm; was stamped out in a discoidal shape having a diameter of 11 mm; was pressed to an aluminum mesh; and was dried to make a positive electrode.

By using the aforementioned positive electrode, in metal lithium foil as a negative electrode, $LiPF_6$/PC (propylene carbonate)+DMC (dimethyl carbonate), 1:1% by volume, was used as the non-aqueous electrolyte to make a CR2016-type coin cell (the lithium-ion secondary battery).

The coin cell (the lithium-ion secondary battery) made as mentioned above was operated at 20° C. to be charged up to 4.25 V relative to a lithium counter electrode with a current density of 0.15 C (175 mAh/g is calculated as 1 C), and furthermore, after the coin cell was charged until a current value becomes 0.001 mA under a fixed voltage of 4.25 V, the coin cell was discharged up to 2.5 V relative to the lithium counter electrode with the current density of 0.15 C to obtain a discharge capacity.

(2) Quantity of lithium compound: Measured by the following method.

By using deionized water, a suspension liquid of 10% by weight of the dried product or the positive electrode active material was prepared, and after being stirred for an hour, a supernatant was titrated up to a second equivalence point with 0.1 mol/L hydrochloric acid using an "Automatic Potentiometric Titrator AT-510" manufactured by Kyoto Electronics Manufacturing Co., Ltd., and the quantity of the lithium compound was calculated by a titer.

(3) Gelation test: Carried out by the following method.

Similar to a paste composition at a time of an actual battery production, the positive electrode active material of 75% by weight, acetylene black of 3% by weight, PVdF (polyvinylidene fluoride) of 19% by weight, and NMP (N-methylpyrrolidone) of 3% by weight were mixed to make a paste. This paste was stored for 16 hours at 80° C., and the existence of gelation was confirmed. The paste wherein the gelation had not been confirmed at all by a visual observation is shown as 0, and the paste wherein the gelation had been confirmed by the visual observation is shown as X.

(4) Conductivity of cleaning fluid: Measured using ES-14 manufactured by Horiba, Ltd.

(5) Quantity of lithium element in recovered liquid: Measured by ICP Emission Spectrometry using iCAP6500 manufactured by Thermo Scientific, Inc.

Incidentally, Table 3 shows characteristics of the liquid components (the first to tenth cleaning fluids) obtained in the First to Second Embodiments, and characteristics of the liquid components after the cleaning treatment was carried out to the lithium-ion secondary battery positive electrode active material, which is the same as that used in the First Embodiment, by only water (without ammonia) for reference in the same manner as the First Embodiment.

TABLE 1

Dried products after being cleaned

| | | $Li_2CO_3$ content (wt. %) | LiOH content (wt. %) | Discharge capacity 4.25-2.5 V (mAh/g) | Ratio of 4.25-3.5 V discharge capacity of dried product relative to 4.25-3.5 V discharge capacity of untreated active material (%) |
|---|---|---|---|---|---|
| Non-cleaned | Untreated positive electrode active material | 0.48 | 0.99 | 191 | — |
| Only dried after being cleaned | First dried product | 0.16 | 0.05 | 188 | 92 |
| | Second dried product | 0.19 | 0.10 | 189 | 95 |
| | Third dried product | 0.22 | 0.10 | 191 | 96 |
| | Fourth dried product | 0.20 | 0.12 | 192 | 95 |
| | Fifth dried product | 0.11 | 0.13 | 191 | 95 |
| | Sixth dried product | 0.19 | 0.11 | 192 | 95 |
| | Seventh dried product | 0.12 | 0.13 | 192 | 96 |
| | Eighth dried product | 0.19 | 0.23 | 193 | 94 |
| | Ninth dried product | 0.22 | 0.22 | 191 | 95 |
| | Tenth dried product | 0.23 | 0.25 | 193 | 96 |
| | Dried product washed by water without $NH_3$ | 0.14 | 0.08 | 191 | 94 |

TABLE 2

Heat-treated products

| | | $Li_2CO_3$ content (wt. %) | LiOH content (wt. %) | Discharge capacity 4.25-2.5 V (mAh/g) | Ratio of 4.25-3.5 V discharge capacity of positive electrode active material relative to 4.25-3.5 V discharge capacity of untreated active material (%) | Gelation Test |
|---|---|---|---|---|---|---|
| Non-cleaned | Untreated active material | 0.48 | 0.99 | 191 | — | X |

TABLE 2-continued

Heat-treated products

| | | $Li_2CO_3$ content (wt. %) | LiOH content (wt. %) | Discharge capacity 4.25-2.5 V (mAh/g) | Ratio of 4.25-3.5 V discharge capacity of positive electrode active material relative to 4.25-3.5 V discharge capacity of untreated active material (%) | Gelation Test |
|---|---|---|---|---|---|---|
| Cleaned → Dried → Heat-treated | First positive electrode active material | 0.13 | 0.12 | 191 | 99 | ○ |
| | Second positive electrode active material | 0.15 | 0.11 | 192 | 99 | ○ |
| | Third positive electrode active material | 0.12 | 0.15 | 192 | 99 | ○ |
| | Fourth positive electrode active material | 0.09 | 0.17 | 194 | 100 | ○ |
| | Fifth positive electrode active material | 0.19 | 0.09 | 190 | 99 | ○ |
| | Sixth positive electrode active material | 0.16 | 0.10 | 192 | 99 | ○ |
| | Seventh positive electrode active material | 0.18 | 0.07 | 194 | 99 | ○ |
| | Eighth positive electrode active material | 0.18 | 0.21 | 193 | 99 | X |
| | Ninth positive electrode active material | 0.17 | 0.22 | 193 | 99 | X |
| | Tenth positive electrode active material | 0.19 | 0.21 | 193 | 99 | X |
| | Active material washed by water without $NH_3$ | 0.12 | 0.10 | 186 | 97 | ○ |
| Only heat-treated | Active material by being only heat-treated | 0.55 | 0.81 | 191 | 99 | X |

TABLE 3

| | Quantity of additional $NH_3$ water (ml) | Liquid conductivity (mS/cm) | Quantity of Li element in liquid (g/l) |
|---|---|---|---|
| Undiluted solution of $NH_3$ aqueous solution | — | 0.7 | — |
| First cleaning fluid | — | 7.2 | 2.1 |
| Second cleaning fluid | 50 | 9.2 | 3.7 |
| Third cleaning fluid | 75 | 9.8 | 4.6 |
| Fourth cleaning fluid | 60 | 10.6 | 5.5 |
| Fifth cleaning fluid | 70 | 11.4 | 5.8 |
| Sixth cleaning fluid | 70 | 11.5 | 6.2 |
| Seventh cleaning fluid | 70 | 11.6 | 6.4 |
| Eighth cleaning fluid | 70 | 11.9 | 6.5 |
| Ninth cleaning fluid | 70 | 11.9 | 6.8 |
| Tenth cleaning fluid | 70 | 11.9 | 6.9 |
| After being washed by water without $NH_3$ | — | 7.3 | 2.2 |

As is obvious from the Table 1, even if the active material is only dried after being cleaned, and is not heat-treated, compared to the non-cleaned active material to which the cleaning treatment is not carried out, contained (unremoved) quantities of lithium carbonate and lithium hydroxide are significantly reduced.

However, as shown in the Table 1, in the battery wherein the positive electrode active material which is only dried after being cleaned is used, the discharge capacity of 4.25 to 3.5 V is 96% or less relative to that of the positive electrode active material before being cleaned. Namely, the ratio of a high voltage region to the whole discharge capacity declines compared to that of the positive electrode active material before being cleaned. If the ratio of the high voltage region is small, even in a case wherein discharge capacities up to 4.25 V to 2.5 V are the same, the energy density declines so as to be unpreferable.

Incidentally, even if the positive electrode active material is cleaned by water without ammonia, although a reducing effect of the lithium compound is obtained, as is obvious from the Table 2, the discharge capacity and the discharge capacity ratio are low. Therefore, an examination wherein a cleaning fluid containing only water is repeatedly used is not carried out.

Also, as is obvious from the Table 2, as a result wherein the positive electrode active material after being dried shown in the Table 1 was heat-treated, contents of $Li_2CO_3$ and LiOH could obtain sufficient reducing effects from the first positive electrode active material to the tenth positive electrode active material. Moreover, $Li_2CO_3$ is slightly different from behaviors of the active material after being dried, and a fourth reducing effect is noticeable. Similarly, in LiOH, fifth and seventh reducing effects are noticeable.

The most required discharge capacity for the aforementioned active materials is approximately the same or above as the case wherein a new cleaning fluid is used for all of the first to tenth active materials, and as is obvious from the Table 2, it can be understood that the aforementioned demand is satisfied. Also, the discharge capacity of 4.25 to 3.5 V was 99% or above relative to that of the active material before being cleaned except for the cleaning by the water without ammonia. Therefore, considering that together with the result in the Table 1, the heat treatment is essential after the cleaning treatment.

However, in the eighth to tenth positive electrode active materials, as with the case of being non-cleaned, the gelation occurred in the gelation test. This is considered to be caused by that since the quantity of the lithium compound in the cleaning fluid (the liquid component after being cleaned) increased, a removal effect of the lithium compound from the positive electrode active material declined. After the eighth positive electrode active material, it is also clear from that the quantity of lithium carbonate and the quantity of lithium hydroxide increased more than before the eighth positive electrode active material. Incidentally, by combining this result with the result in the Table 3, it is clear that the residual lithium compound increases with the conductivity of the repeatedly used cleaning fluid (the liquid component after being cleaned) of 11.9 mS/cm or above (Li content of 6.5 g/L or above) so as to tend to undergo the gelation.

Third Embodiment

In a case wherein the conductivity of the cleaning fluid exceeds 11.0 mS/cm, except for using the cleaning fluid prepared to have the conductivity of 10.0 mS/cm or less, the cleaning treatment same as that in the Second Embodiment was carried out, and 170 ml of each liquid component respectively recovered after the eighth, ninth, and tenth cleanings, and 130 ml of 1% ammonia aqueous solution were mixed to make a cleaning fluid. The conductivity of the respective cleaning fluids was 9.0 mS/cm.

Per each positive electrode active material obtained by respectively carrying out the cleaning treatment using the aforementioned cleaning fluids, and heat-treating after drying, the evaluation tests same as those in the Table 2 were carried out. Results are shown in Table 4.

As is obvious from the Table 4, if the cleaning fluid prepared to have the conductivity of 10.0 mS/cm or less is used, the quantity of the lithium compound becomes small, so that the positive electrode active material, which does not undergo the gelation in the gelation test, and which has 99% or above of the discharge capacity of 4.25 to 3.5 V relative to that before being cleaned, can be obtained. Therefore, if the cleaning fluid is prepared to have the conductivity of 11.6 mS/cm or less, preferably, 10.6 mS/cm or less, and more preferably, 10.0 mS/cm or less, it is clear that the repeatedly used number of the cleaning fluid can increase.

Fourth Embodiment

Except that ethanol is added to new ammonia water prepared in the First Embodiment in such a way as to have 90% by weight, the positive electrode active material to be cleaned was treated in the same manner as the First to Third Embodiments. Results are shown in Table 5.

In the results, only the contents of $Li_2CO_3$ and LiOH, both after being cleaned and after being heat-treated, are reduced to be equal to or at most approximately several percentages smaller compared to the results in the Table 1 and the Table 2. However, a drying time can be shortened from a little over 10% to at most approximately 20% in obtaining a dry state equal to that in the First to Third Embodiments.

TABLE 4

| | | | Heat-treated products | | | | |
|---|---|---|---|---|---|---|---|
| | Repeatedly used cleaning fluid | Additional NH$_3$ water quantity (ml) | Conductivity before being cleaned (mS/cm) | Li2CO3 content (wt. %) | LiOH content (wt. %) | Discharge capacity 4.25 2.5 V (mAh/g) | Ratio of 4.25-3.5 V discharge capacity of positive electrode active material relative to 4.25-3.5 V discharge capacity of untreated active material (%) | Gelation Test |
| Non-cleaned | — | — | — | 0.48 | 0.99 | 191 | — | X |
| Cleaned ↓ Dried ↓ Heat-treated | Eighth cleaning fluid | 103 | 9.0 | 0.14 | 0.14 | 191 | 99 | ○ |
| | Ninth cleaning fluid | 130 | 9.0 | 0.12 | 0.15 | 191 | 99 | ○ |
| | Tenth cleaning fluid | 130 | 9.0 | 0.14 | 0.13 | 192 | 99 | ○ |

TABLE 5

| | Heat-treated products | | | | |
|---|---|---|---|---|---|
| | $Li_2CO_3$ content (wt. %) | LiOH content (wt. %) | Discharge capacity 4.25-2.5 V (mAh/g) | Ratio of 4.25-3.5 V discharge capacity of positive electrode active material relative to 4.25-3.5 V discharge capacity of untreated active material (%) | Gelation Test |
| Non-cleaned | 0.48 | 0.99 | 191 | — | X |
| Cleaned ↓ Dried ↓ Heat-treated | 0.15 | 0.19 | 193 | 99 | ○ |

INDUSTRIAL APPLICABILITY

According to the process of the present invention, while preventing the gelation of the positive electrode active material used as the positive electrode material, the quantity of the lithium compounds which are present on a particle surface or between particles of the positive electrode active material, and are unsuitable for the positive electrode material, can be excellently reduced.

Consequently, the positive electrode active material obtained by the process of the present invention is used as the positive electrode material of the lithium-ion secondary battery so as to effectively suppress the swelling of the battery due to the generation of a gas such as $CO_2$ and the like inside the battery, and the decline in the battery characteristics such as charge/discharge efficiency and the like. The process of the present invention is suitable for producing the positive electrode material of the lithium-ion secondary battery.

Also, in the process of the present invention, in a case wherein the cleaning fluid is repeatedly used, a quantity of a final cleaning waste fluid as well as a used quantity of the cleaning fluid can be significantly reduced, and a cost required for the treatment process for the waste fluid can be sharply decreased. As a result, a production cost of the positive electrode active material can be declined.

Also, in the waste fluid, the lithium compounds are accumulated with a high concentration by repeatedly using the cleaning fluid, and the lithium compounds are extremely important compounds as raw materials of the positive electrode active material of the battery as well as the raw materials of the lithium-ion secondary battery, and it is extremely easy to recover the valuables from the waste fluid containing the aforementioned compounds with the high concentration.

What is claimed is:

1. A treatment process for a positive electrode active material for a lithium-ion secondary battery, comprising:
    cleaning a positive electrode active material for the lithium-ion secondary battery by a cleaning fluid containing ammonia,
    separating the cleaning fluid to solid and liquid,
    calcining a solid component at 600° C. to 700° C. in an oxygen atmosphere,
    cleaning another positive electrode active material for the lithium-ion secondary battery by a new cleaning fluid with a recovered liquid separated at said separating of the cleaning fluid,
    separating the new cleaning fluid to solid and liquid again, and
    calcining a solid component separated from the new cleaning fluid at 600° C. to 700° C. in an oxygen atmosphere,
    wherein the new cleaning fluid has a conductivity of 11.6 mS/cm or less,
    the positive electrode active material for the lithium-ion secondary battery treated is used as a positive electrode material of the lithium-ion secondary battery,
    a discharge capacity of 4.25 V to 3.5 V of the lithium-ion secondary battery is 99% or above relative to a discharge capacity before being cleaned,
    a quantity of the positive electrode active material to be cleaned is 30-50% by weight relative to a quantity of the cleaning fluid, and
    the positive electrode active material becomes a slurry in the cleaning fluid, and after being stirred in a slurry state, the positive electrode active material is left still as it is for 20 minutes to one hour at a room temperature to approximately 30° C.

* * * * *